(12) United States Patent
Natanzon et al.

(10) Patent No.: US 10,824,956 B1
(45) Date of Patent: Nov. 3, 2020

(54) SYSTEM AND METHOD FOR PRICE ESTIMATION OF REPORTS BEFORE EXECUTION IN ANALYTICS

(71) Applicant: EMC Corporation, Hopkinton, MA (US)

(72) Inventors: Assaf Natanzon, Tel Aviv (IL); Anat Parush Tzur, Be'er Sheva (IL); Amihai Savir, Negev (IL); Oshry Ben-Harush, Kibutz Galon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 893 days.

(21) Appl. No.: 15/194,173

(22) Filed: Jun. 27, 2016

(51) Int. Cl.
*G06N 7/00* (2006.01)
*H04L 12/26* (2006.01)
*G06N 20/00* (2019.01)
*G06N 20/10* (2019.01)
*G06N 20/20* (2019.01)
*G06Q 10/06* (2012.01)

(52) U.S. Cl.
CPC ............. *G06N 7/005* (2013.01); *G06N 20/00* (2019.01); *H04L 43/06* (2013.01); *G06N 20/10* (2019.01); *G06N 20/20* (2019.01); *G06Q 10/06313* (2013.01); *G06Q 10/06375* (2013.01); *G06Q 2220/12* (2013.01)

(58) Field of Classification Search
CPC ........ G06N 20/00; G06N 20/10; G06N 20/20; G06N 7/005; G06F 2209/5019; H04L 43/06; G06Q 10/06313; G06Q 10/06375; G06Q 2220/12

USPC .......................................................... 706/52
See application file for complete search history.

(56) References Cited

U.S. PATENT DOCUMENTS

| 7,480,640 | B1 * | 1/2009 | Elad ....................... G06Q 10/10 706/14 |
| 10,410,260 | B1 * | 9/2019 | Pollock .............. G06Q 30/0283 |
| 2013/0185433 | A1 * | 7/2013 | Zhu ........................ H04L 67/303 709/226 |
| 2015/0170049 | A1 * | 6/2015 | Mann ..................... G06N 20/00 706/12 |
| 2015/0363838 | A1 * | 12/2015 | Wu ..................... G06Q 30/0278 705/306 |
| 2015/0370871 | A1 * | 12/2015 | Bender ............. G06F 16/24568 707/602 |
| 2016/0239919 | A1 * | 8/2016 | Eder ........................ G06Q 10/06 |

* cited by examiner

*Primary Examiner* — Shane D Woolwine
(74) *Attorney, Agent, or Firm* — Staniford Tomita LLP

(57) ABSTRACT

A report cost estimation module is used with cloud storage systems that store and process client data. Reports on the cloud stored client data take a significant amount of CPU, memory, storage and networking resources. A data analysis model dynamically estimates pricing for client data reports according to resource consumption by identifying a cluster group for the report and using the designated regression model for the cluster group. The data analysis can store the estimated and actual report costs and improve the estimated report costs using machine learning algorithms and crowed sourcing techniques. The report price is accurately provided to the client before running the report and thus allowing the customer to carefully manage a client report budget.

14 Claims, 15 Drawing Sheets

| Report Name | Therm Config | Battery Status | Battery Config | Trend Line | Recovery Connect Managed Engines | Recovery Obsolete Recovery Points | Recovery Host Analysis Tasks | Recovery Gap Details | Active Jobs By Server | Failed Backup Jobs After Deduplication | Join | Add Fields | Multiply Fields | DPA Enabler Count | Merge Elements |
|---|---|---|---|---|---|---|---|---|---|---|---|---|---|---|---|
| System Change Summary | 0 | 1 | 0 | 0 | 1 | 0 | 0 | 0 | 0 | 0 | 0 | 1 | 0 | 1 | 0 |
| Backup Application Change Details for ruleset | 0 | 0 | 0 | 0 | 0 | 0 | 0 | 0 | 0 | 0 | 0 | 0 | 0 | 0 | 0 |
| Tape Drive Config Change Details | 0 | 0 | 0 | 0 | 0 | 1 | 1 | 0 | 1 | 0 | 1 | 0 | 0 | 1 | 0 |
| Backup Client Config Change Summary | 0 | 0 | 0 | 0 | 0 | 0 | 0 | 0 | 0 | 0 | 0 | 0 | 0 | 0 | 1 |
| Network Interface Config Change Details | 0 | 0 | 0 | 1 | 0 | 0 | 0 | 0 | 0 | 0 | 0 | 1 | 0 | 0 | 0 |
| Memory Config Change Details | 0 | 0 | 0 | 0 | 0 | 0 | 0 | 0 | 0 | 1 | 0 | 0 | 0 | 0 | 0 |
| Backup Application Config Changes for Pools | 0 | 0 | 0 | 1 | 0 | 0 | 1 | 0 | 0 | 0 | 1 | 0 | 1 | 0 | 0 |
| Virtual Host Host Config Change Details | 0 | 0 | 1 | 0 | 0 | 0 | 0 | 0 | 0 | 0 | 0 | 0 | 0 | 0 | 0 |
| Backup Job Config Change Summary | 0 | 0 | 0 | 0 | 1 | 0 | 0 | 0 | 0 | 1 | 0 | 0 | 1 | 0 | 1 |
| Backup Schedule Config Change Summary | 0 | 0 | 0 | 0 | 0 | 1 | 0 | 0 | 0 | 0 | 1 | 0 | 0 | 0 | 0 |
| Backup Job Config Change Details | 0 | 0 | 0 | 0 | 1 | 0 | 0 | 1 | 0 | 0 | 1 | 0 | 0 | 0 | 0 |
| Fileserver Export Change Details | 0 | 0 | 0 | 0 | 0 | 1 | 0 | 0 | 0 | 0 | 0 | 0 | 1 | 0 | 0 |
| Backup Schedule Config Change Details | 0 | 0 | 0 | 0 | 0 | 0 | 0 | 0 | 0 | 0 | 0 | 0 | 0 | 0 | 0 |
| Backup Group Config Change Details | 0 | 0 | 0 | 0 | 1 | 0 | 0 | 0 | 1 | 0 | 0 | 1 | 0 | 0 | 0 |
| System Change Details | 0 | 0 | 0 | 1 | 0 | 0 | 0 | 1 | 0 | 1 | 0 | 0 | 0 | 0 | 0 |
| Virtual Host Disk Config Change Details | 0 | 0 | 0 | 0 | 0 | 0 | 0 | 0 | 0 | 0 | 0 | 0 | 0 | 1 | 0 |
| Virtual Host Host Change Details | 0 | 0 | 1 | 0 | 0 | 0 | 0 | 0 | 1 | 0 | 0 | 0 | 1 | 0 | 1 |
| Backup Client Config Change Details | 1 | 0 | 0 | 0 | 0 | 0 | 0 | 1 | 0 | 0 | 1 | 0 | 0 | 0 | 0 |
| Filesystem Performance Summary | 0 | 1 | 0 | 0 | 0 | 0 | 0 | 0 | 0 | 0 | 0 | 0 | 0 | 0 | 1 |
| RecoverPoint RPA Compression | 0 | 0 | 0 | 1 | 0 | 0 | 0 | 1 | 0 | 1 | 0 | 0 | 0 | 0 | 0 |
| Virtual Fibre Channel Port Performance By Node | 1 | 0 | 0 | 0 | 0 | 0 | 1 | 0 | 0 | 0 | 1 | 0 | 0 | 0 | 0 |
| Fibre Channel Device Performance | 0 | 0 | 0 | 0 | 1 | 0 | 0 | 0 | 0 | 0 | 0 | 1 | 0 | 0 | 1 |
| Filesystem Throughput with Direction | 0 | 0 | 0 | 0 | 0 | 0 | 1 | 0 | 0 | 0 | 0 | 0 | 0 | 0 | 0 |

FIG. 8

DATA SOURCES LIST:

| | | |
|---|---|---|
| Thermometer Configuration | All Nodes Of Type | NetBackup Disk Pool Status |
| PSU Status | Recoverability Gap Details | NetBackup Storage Server Status |
| Battery Status | Recoverability SLM Status | NetBackup Job Forecast |
| Battery Configuration | Recoverability Server To Storage Mappings Tabular | NetBackup Vault Ejects |
| Trend Line | Recoverability Logs | NetBackup Storage Unit Group Config |
| Recoverability Connector Managed Engines | Recoverability Server To Storage Mappings Topology | NetBackup Vault Job Media |
| Recoverability Engines | Recoverability Engine Managed Object Storage Mapping | TSM Defined Server Status |
| Fan Configuration | Recoverability Applications Data Files | NetBackup Vault Details |
| Fan Status | Recoverability Engine Managed Object Process View | NetBackup Lifecycle Policy Destination |
| PSU Configuration | RPO Violation Details Datasource | NetBackup Server Config |
| Thermometer Status | Replication RPO Compliance | NetBackup Group Forecast |
| Card Status | Recoverability Visualization | NetBackup Vault Attempts |
| Recoverability Obsolete Recovery Points | Recoverability Unprotected File Systems | TSM Replication Node Status |
| Card Configuration | Recoverability Devices | NetBackup Storage Server Config |
| Virtual Tape Library (VTL) Status | Recoverability Recovery Points | Mirror Performance |
| Virtual Tape Library (VTL) Configuration | Recoverability Gaps | Remote Mirror Status |
| Disk library (DL) Failover Status | Recoverability Excludes | Mirror Configuration |
| Virtual Tape Library (VTL) Configuration Options | Recoverability Storage To Server Mappings Topology | Mirror Status |
| Conditional Report | Recoverability Tasks | Remote Mirror Performance |
| System Variable | Network Interface Performance By Node | Remote Mirror Configuration |
| Read XML File | Webserver Response | iSCSI Configuration |
| Read CSV File | Webserver Configuration | iSCSI Status |
| User Input | AE Ruleset Model Topology Report Datasource | iSCSI ISNS Configuration |
| User Input | Network Interface Status | iSCSI Portal Configuration |
| Database Query | Network Interface Performance | TSM Move Errors |
| Active Directory Host List | Network Interface IP Config | TSM LAN Free Server Status |
| Disk LUN Status | Network Link Pair Duplex | TSM Reclamation Errors |
| Disk Activity By Node | Networker Client Storage Nodes Config | TSM Expiration |
| Disk Activity By Device | Network Interface Performance By Interface | TSM Num Migration Jobs By Storage Pool |
| Disk Status | Network Interface Config | TSM Total Logical Occupancy |
| Disk Performance By Device | Network Link Pair Autonegotiation | TSM Reclamation |
| Disk Performance By Node | NetBackup Disk Pool Config | TSM Replication Process Summary |
| Data Protection | NetBackup Media Server Config | TSM Audit Occupancy |
| Disk logical unit number LUN Configuration | NetBackup Catalog Backup Config | TSM Total Size Reclaimed By Storage Pool |
| Disk LUN Performance | TSM Disaster Recovery Media | TSM Database Utilization |
| Disk Performance | NetBackup Disk Volume Status | TSM Database Volumes |
| Disk Configuration | NetBackup Device Cleaning | Backup Schedule Config Dates |
| Disk Activity | NetBackup Disk Volume Config | TSM Move |
| Disk Count By Use | NetBackup Catalog Backup File Config | TSM Migration |
| Disk Count By State | NetBackup Vault Job Disk Media | TSM Expiration Errors |
| Recoverability Rules | NetBackup Vault Preview | TSM Database Backup Errors |
| Recoverability RP Drill Down | NetBackup Lifecycle Policy Config | Root Cause For CG Details Datasource |
| Recoverability Host Analysis Tasks | TSM Migration Errors | TSM Device Path |
| Recoverability Replication Configuration | NetBackup Storage Unit Config | TSM Command Events |

FIG. 9A

DATA SOURCES LIST:

| | | |
|---|---|---|
| TSM Total Size Migrated By Storage Pool | LUN Performance | Analysis History |
| TSM Defined Server Configuration | LUN Mapping | Agent Configuration |
| TSM Client Filespaces | Exported LUNs | Registered Collectors |
| TSM LAN Free Server Configuration | LUN Performance By LUN | Audit Log |
| TSM Backup Set | LUN Performance By Node | Node Details |
| TSM Total Items Migrated By Storage Pool | LUN Configuration | Networker Last Backup Details by Client and Job Within Filtered Group |
| TSM Storage Pool Copy | Name Cache Hit Rate By Node | NetWorker Storage Node Config |
| TSM Num Reclamation Jobs By Storage Pool | Name Cache Hit Rate | NetWorker Bootstrap |
| TSM Delete Volume | Inode Cache Hit Rate | Record File Usage |
| TSM Storage Pool Copy Errors | File server exports | Service Status |
| TSM Database Backup | File server performance | Database Usage |
| TSM Replication Process Details | Inode Cache Hit Rate By Node | Purge Status |
| TSM Total Items Reclaimed By Storage Pool | Inode Cache Hit Rate By Node | System Dynamics |
| Collector Status | Inode Cache Hit Rate By Node | Datafile Usage |
| Mirrorview Replication Lag | File server client performance | Deduplication Garbage Collection Status |
| Masking Configuration | File server Status | Deduplication Group Forecast |
| Total Replicated Capacity | Ethernet Topology Report Datasource | Deduplication Audit |
| RDF Configuration by Source | Node Topology Report Datasource | Deduplication Job Forecast |
| SRDF/A Replication Lag | Backup Job Topology Report Datasource | Deduplication Retention Policy Configuration |
| Storage Replication Status | SLA Schedule Details | Backup Server Utilization |
| RDFA Performance | Processor Utilization By Client | Virtual Host Network Interface Configuration |
| Objects Not Meeting RPO | Processor Configuration | Backup Job Resolution |
| Average Replicated Capacity | Processor Utilization | Restarted Backup Job Details |
| Replication Data Transfer Statistics | Processor Utilization By CPU | Num Jobs |
| Mirrorview Replication Cycle | Processor Status | Number of Volumes by Jukebox |
| RDF Configuration by CG | License Conformance | Restore Job Media |
| CG Configuration | License Configuration | Backup Job Details with Volume |
| Mirrorview Configuration | Request History | Restore Attempts |
| Replication Alerts by Group | DPA Enabler Activity | Total Size (MB) |
| Replication Key Performance Indicators | Publisher Status | Cluster Resource Mapping |
| Mirrorview Performance | Audit Details | Backup Device Performance With Jukebox |
| RDFG Configuration | Agents Status | Backup Server Config |
| LUN Status | Request History Summary | Maintenance Job Attempts |
| RDF Configuration by Destination | Report History | Backup Job Status |
| Replication Performance | Application Exposure | Backup Pool Configuration |
| RDF Configuration | Process Log | Maintenance Job Details |
| Mirrorview CG Performance | Analysis Engine Status | Backup Device Status |
| RDFG Configuration over time | Listener Status | Backup Job Errors |
| Replication Alerts by Group by Age | User Details | Backup Device Errors |
| Imported LUNs | HTTP Request Performance Statistics | Backup Pending Mounts |
| Backup Group Config | Objects with Replication Exposures | Active Jobs |
| SRDF/A Replication Cycle Time | Report Times | Backup Pool Group Config Mapping |
| Replication Status | Agents Errors | Job Configuration Changes Data Source |
| DG Configuration | Scheduled Report Forecast | Backup Client Config |

FIG. 9B

DATA SOURCES LIST:

| | | |
|---|---|---|
| Backup Job Details for Clients with Failures | Root Cause for Replication Lag Report Datasource | Staging Media |
| Root Cause for Alert Report Datasource | Root Cause For Job Details Datasource | Num Stages |
| Num Maintenance Jobs | Backup Device Config | Total Staging Size |
| Backup Pool Client Config Mapping | Number of Volumes by Device | Host Status |
| Last Backup Details by Client and Job | Backup Group Details | Host Configuration |
| Backup Job Config | Backup Device Status With Jukebox | Solid State Storage Status |
| Backup Schedule Config | Total Size Scanned | Solid State Storage Performance |
| Backup Job Details | Num Devices | Solid State Storage Configuration |
| Maintenance Job Errors | Restore Job Resolution | Fibre Channel Port Config |
| Backup Client Occupancy By Client - Logical | Backup Server Status | Fibre Channel Device Performance From Switch |
| Backup Pool Status | Num Backup Jobs After DeDuplication | Fibre Channel Performance |
| Total Size By Device | Restore Job Errors | Fibre Channel Performance By Port |
| Backup Job Details with Retention | Total Size Scanned (MB) | Fibre Channel Device to Tape Drive Mapping |
| Restarted Jobs | Open Files | Fibre Channel Devices |
| Backup Job Disk Media | Rack Config | Fibre Channel Port Status |
| Total Size | Backup Jukebox Config | Fibre Channel Performance By Node |
| Backup Group Status | Restore Details | Fibre Channel Port Link Partner |
| Active Jobs By Client | Restore Status | Fibre Channel Port Count By Node |
| Restore Statistics | Backup Statistics | Virtual Host Status |
| Active Jobs By Server | Num Jobs In Event State By Server | Virtual Centre Server Configuration |
| Backup Server Mapping | Backup Device Performance | Virtual Host Disk Configuration |
| Total Files | Enclosure Config | Virtual Host Disk Performance |
| Backup Job Details After DeDuplication | Disk Array Status | Virtual Host Network Interface Status |
| Backup Client Occupancy | Virtual Host Configuration | Virtual Host Processor Performance |
| Num Failed Backup Jobs After DeDuplication | Root Cause for RPO Violation Report Datasource | Virtual Host Network Interface Performance |
| Backup Pool Device Config Mapping | Disk Array Config | Datafile Config |
| Num Jobs In Event State | Active Clone Jobs | Virtualization Servers |
| Last Backup Details | Clone Media | Virtual Hosts |
| Backup Device Access Filesystem Used Space | Uncloned Backup Jobs | CIM Mapping |
| Last Backup Details by Client and Job Within Filtered Group | Tape Library Errors | Consistency Group Copy Configuration |
| Num Clients | Clone Operations | Num Slots |
| Backup Device Session | Total Clone Size | Tape Library Configuration |
| Root Cause for Backup Report Datasource | Num Clones | Tape Library Cap Status |
| Backup Job Attempts | Clone Attempts | Tape Library Slot Status |
| Total Duration | Clone Objects | Num Volumes |
| Restore Job Disk Media | Num Clone Jobs In Event State | Tape Library Volume Status |
| Backup Client Occupancy By Client - Physical | Database Server Config | Consistency Group Copy CS Performance |
| Backup Job Device Mapping | Clone Job Media | Analysis Event for Children |
| Backup Job Media | Clone Job Details | Analysis Events |
| Backup Data Domain Clone Details | Clone Job Disk Media | Consistency Group Configuration |
| Backup Client Occupancy By Client | Num Uncloned Backup Jobs | Tape Library Status |
| Backup Device Access Filesystem Details | Clone Job Status | Consistency Group Copy Performance |
| Backup Client Status | Application Errors | Consistency Group Images |
| Backup Pool Job Config Mapping | Stage Operations | Consistency Group Data Transferred |

FIG. 9C

DATA SOURCES LIST:

| | | |
|---|---|---|
| Splitter Status | Access Group Configuration | Checkpoint Status |
| Consistency Group Copy CS Performance Statistics | Data Domain Boost File Replication Statistics | Replication Visualization |
| RPA Site Performance | Data Domain System Licenses | Automatic Cartridge System Library Software (ACSLS) Lock Status |
| RPA Configuration | Data Domain Boost Files | ACSLS Server Status |
| Pools On Data Domain | Data Domain System User Status | ACSLS ACS Status |
| CRR Consistency Group Configuration | Data Domain Cascaded Replication | ACSLS Port Status |
| Consistency Group Status | Data Domain Boost Option Status | Media Usage By Pool |
| Splitter Configuration | Data Domain System Capacity Licenses | Media Contents |
| Consistency Group Data Protected | Data Domain Boost Files for Devices | Media Count By State |
| RecoverPoint Events | Data Domain Boost Storage Unit Statistics | Filesystem Status |
| Data Domain Boost Statistics | Data Domain Last Synch Time for Server | Media Written To |
| RPA CS Performance | Data Domain Filesystem Options | Media Count By Pool and Location |
| Consistency Group Copy Status | MTree Daily Compression Statistics | Media Count By Pool and State |
| RPA Performance | Data Domain Active Streams | Media Count By Pool and State and Location |
| RPA Throughput Statistics | Data Domain Modes | Media Count |
| RPA Status | Data Domain Replication | Media Details |
| Replication Set Configuration | Process Count By Host | Media Usage |
| RecoverPoint Volumes | Process Status | Media Usage By Pool and Location |
| Connection Status | Process Count | Media Configuration |
| Database Status | Tape Drive Performance From Switch | Infiniband Port Performance |
| Log File Configuration | Tape Drive Performance By Device | Media Count By Location |
| Schema Config | Tape Drive Performance Write Throughput (MB) | Num Media Written To |
| Index Config | Tape Drive Status | Media Written To By Job Id |
| Database Params | Tape Drive Configuration | Media Count By State and Location |
| Log File Status | Tape Drive Performance | Media Usage By Location |
| Memory Configuration | Tape Drive Performance From Best Source | Media Count By Pool |
| Database Config | Cluster Status | Filesystem Used Files By Client |
| Partition Status | Cluster Configuration | Filesystem Used Space |
| Table Status | Cluster Resource Status | Filesystem Utilization By Client |
| Datafile Status | Volume Linkage | Filesystem Configuration |
| Index Status | Virtual Data Mover Configuration | Filesystem Utilization By Partition |
| Tablespace Config | Checkpoint Mount Hosts | Physical To Virtual Port Mapping |
| Database Server Params | Filesystem Mount Configuration | Infiniband Port Status |
| Database Server Status | Volume Configuration | Filesystem Capacity By Client |
| Table Config | Quota Configuration | Filesystem Disk Configuration |
| Control File Configuration | System Replication Performance | Filesystem Performance By Node |
| Tablespace Status | Quota Status | Filesystem Used Files |
| Partition Config | Tree Configuration | Filesystem Utilization |
| Memory Performance | Filesystem to LUN Visualization | Infiniband Port Configuration |
| Data Domain Filesystem Archive Unit Status | Data Mover Configuration | Filesystem Capacity |
| Memory Status | Storage Pool Configuration | Filesystem Performance By Filesystem |
| MTree Quota Configuration | Filesystem Performance | Filesystem Used Space By Client |
| MTree Retention Lock Status | Replication Configuration | Filesystem Disk Performance |
| Daily Compression Statistics | System Replication Status | Filesystem Disk Status |

FIG. 9D

DATA SOURCES LIST:

| Filesystem Disk Activity | NetApp Cluster Status | Netapp Cluster Partner License Configuration |
|---|---|---|
| Aggregate Configuration | NetApp System File Configuration | Save Pool Configuration |
| Aggregate Utilization | Processor Utilization by CPU for Cluster Partner | VNX/CLARiiON PIT Replications |
| NetApp VFiler Configuration | Replication Rule Configuration | Storage Pool Config |
| Processor Utilization for Cluster Partner | Save Pool Devices | Component LUN |
| Volume Priority Configuration | Symmetrix RDF Configuration | Pool Application Growth |
| Aggregate Status | Application LUN | Save Pool Status |
| VNX/CLARiiON PIT Replication Targets | Symmetrix Snapshot Rule Status | RAID Group Configuration |
| NetApp Configuration | Symmetrix Local Replications | Application Growth |

FIG. 9F

OPERATORS LIST:

| | | |
|---|---|---|
| Diff | Translation | Predict |
| Divide Series | Deduplicate | Copy |
| Missing | Divide Fields | High-Pass Filter |
| Limit | Job Average | Low-Pass Filter |
| Range | Join | Add Object Field |
| Order | Number of Different Values | Upper Case |
| Drop | SLA Job Information | Time Shift |
| Extended Job Info | Missing Job | Percent Growth |
| Count | Extended Job Rollup | Number Active |
| Multiply | Time-based audit | Multiply Series |
| Moving Average | SetKey | Missing Client |
| Polynomial Trend | LastValue | Merge Elements |
| Rename Field | Count By Interval | Lower Case |
| Merge | Rollup | NetBackup Merge |
| Divide | Add | Group Low Values |
| Accumulate | ChargeBack | Count Values |
| Sum | Distribution | Consecutive Counts |
| Add Field | Annotate | Baseline |
| Summarize | Add Fields | Recoverability Policy Details |
| Event Rollup | Multiply Fields | Set Value |
| Add Series | Subtract | Extended Device Info |
| Subtract Series | Subtract Fields | Group By |
| Dummy | Object-based audit | Deduplication Merge |
| Average | DPA Enabler Count | Replication ChargeBack |
| Maximum | Time to duration | Convert To Number |
| Minimum | Digitise | Flatten |
| Time Active | States to Status | Date Format |
| Collector Error Rollup | Search and Replace | Concatenate |
| Extended Tape Drive Info | NULL to Zero | Predict Linear |

SYSTEM AND METHOD FOR PRICE ESTIMATION OF REPORTS BEFORE EXECUTION IN ANALYTICS

FIELD

The present invention relates generally to providing estimated report costs for client data stored in cloud based data storage.

BACKGROUND

For client computer networks, client report systems can be used to generate client network reports. As data storage migrates from client networks to cloud based systems, the servers that provide the cloud storage must use shared processor resources to produce system reports. The cloud provider will maintain the reporting software and may need to bill the client for the construction of the reports for client cloud data storage systems.

Reporting software is used with cloud computing platforms to retrieve information from various data sources to provide real-time, historical, and projected visibility into the performance of infrastructure and business services. The reporting software can have a multi-tier architecture that is composed of modules that can be installed on a single server or be distributed and scaled over multiple servers. The reporting software can be used to produce system reports from the data stored in the database. With comprehensive reports, the client can know the status of the managed infrastructure and business services. This information can be used to troubleshoot problems, understand trends, and verify compliance of service level agreements.

Because the client may want to know the cost of a report before the report is run, there is a need for a system and method for estimating the price of a report prior to running the report for cloud based data storage systems. Estimating the costs of client reports for client data stored in cloud storage devices was not an issue before cloud storage became popular. The client report systems are on the client network and did not utilize cloud resources so there was no need to calculate the estimated cost for client data reports.

BRIEF DESCRIPTION OF THE DRAWINGS

The present invention will be readily understood by the following detailed description in conjunction with the accompanying drawings, wherein like reference numerals designate like structural elements, and in which:

FIG. 8 illustrates a table of report types, data sources and operator features.

FIGS. 9A-9F are tables listing possible data sources.

FIG. 10 is a table listing possible operators.

DETAILED DESCRIPTION

Figure 1:
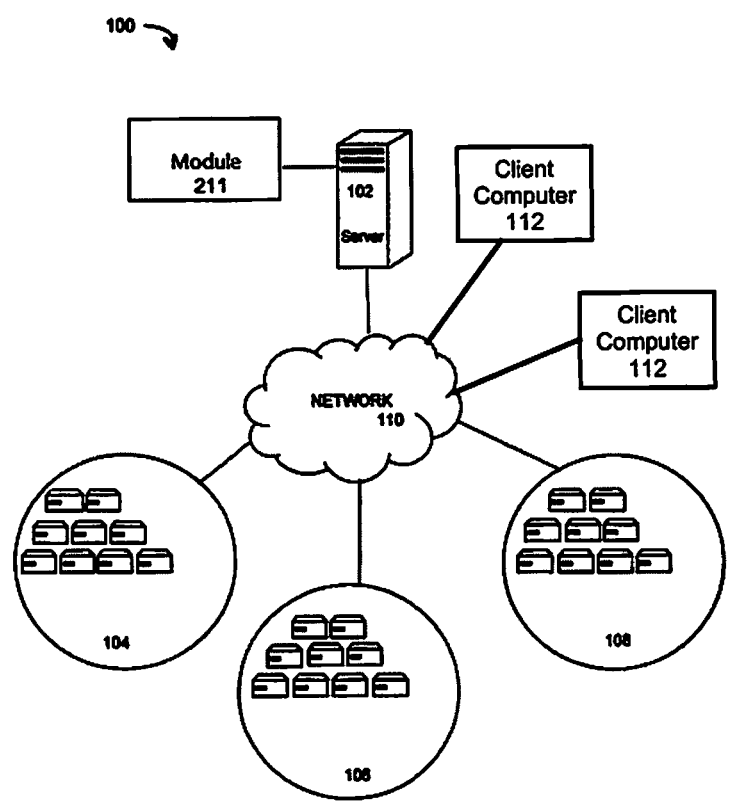
FIG. 1 is a diagram of a system configured to provide multi-tenancy cloud service in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Storage systems should continue to migrate and expand into cloud-based systems, which utilize central servers and storage devices serving multiple clients. When a client wants a report, the cloud-based storage system must perform all of the report processing and the client can be charged for these reports. The ability to estimate the cost of a report becomes an important service to provide to clients so that the client can know the cost of the report before the report processing is performed. The client can then make informed decisions when ordering reports. Accordingly, it is desirable to have an adaptive method and system for estimating the costs of reports for cloud based client storage systems. Disclosed herein are methods and systems that provide a client with a cost estimate for a report prior to running the report.

Reporting software can be used with cloud computing platforms to retrieve information from various data sources to provide real-time, historical, and projected visibility into the performance of infrastructure and business services. The reporting software can be composed of modules that can be installed on a single server or be distributed and scaled over multiple servers. The reporting software can be used to produce system reports, alerts and logs from the data stored in the database. With comprehensive targeted reports, the reporting software can provide in real-time, the status of the managed infrastructure and business services. This information can be used to troubleshoot problems, understand trends, and verify compliance of service level agreements.

FIG. 1 illustrates a computer network system 100 that implements reporting software and includes a number of data sources 104, 106, and 108 and client computers 112. The data sources 104, 106, and 108 are coupled together via network 110, which may be a cloud network. A network server computer 102 is coupled directly or indirectly to these data sources 104, 106, and 108 through network 110. The network system 100 may contain any number of such data sources 104, 106, and 108. The network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. The system 100 may represent a multi-tenant network in which a server computer 102 serving multiple client computers 112. The server 102 runs software that may monitor data collected from multiple other data source components 104, 106 and 108. The client's data will be stored and processed in the cloud. This cloud storage and processing can dramatically enhance the analytics capabilities of the cloud system 100, which can be provided to the clients as reports. The reporting software module 211 makes use of this consolidated data by connecting to the server 102 and retrieving this data. In an embodiment, the reporting software module 211 can include a data protection advisor (DPA) that can be offered to the client computers 112 in communication with the cloud system 100.

One of the main challenges for a cloud system 100 is pricing a report for a client computer 112. The price of a report can be proportional to the time and resources needed to complete the report. Some reports take significant amount of CPU, memory, storage and networking resources while other reports can take much fewer resources and processing time. The reports can be dynamically priced according to the system 100 resource consumption required to complete the report. In an embodiment, the inventive system can provide an estimated price for the report prior to running the report. This dynamic estimated pricing can be calculated with machine learning algorithms and crowd sourcing techniques. Once the reporting software module 211 estimates the report price, this information can then be presented to the client for approval. The client can approve the cost estimate before the report is run or the client can reject the cost estimate which can result in cancelling the report. This can allow the clients to make informed report purchase decisions and improve budget management.

The present invention is directed towards a cost estimation process that can increase the transparency of reports to the customer and improve the customer experience. The inventive system can also provide a charging model for the customers based on their cloud processor usage. In an embodiment, the analytic solution can be composed from the following components: a clustering module for classifying a report based upon the report features, software for extracting and/or generating report features and a plurality of competitive regression models that are used to estimate prices for reports based upon the report features.

A clustering module can be a module that is used to generalize the knowledge gained from different customers usages. The features of a new client report can be received, extracted and/or generated by the reporting software module. The features of the new client report can be compared to the features of existing report clusters. The reporting software module can then identify the known report that has matching features or the greatest number of matching features. The reporting software module can utilize the regression model for the report name that matches or most closely matches the new report. Using clustering techniques, reports that act similar to each other will be set by the system into the same cluster. That will allow the inventive system to deal with unseen reports by leveraging the knowledge gained from similar reports that had been executed by other customers.

Figure 2:
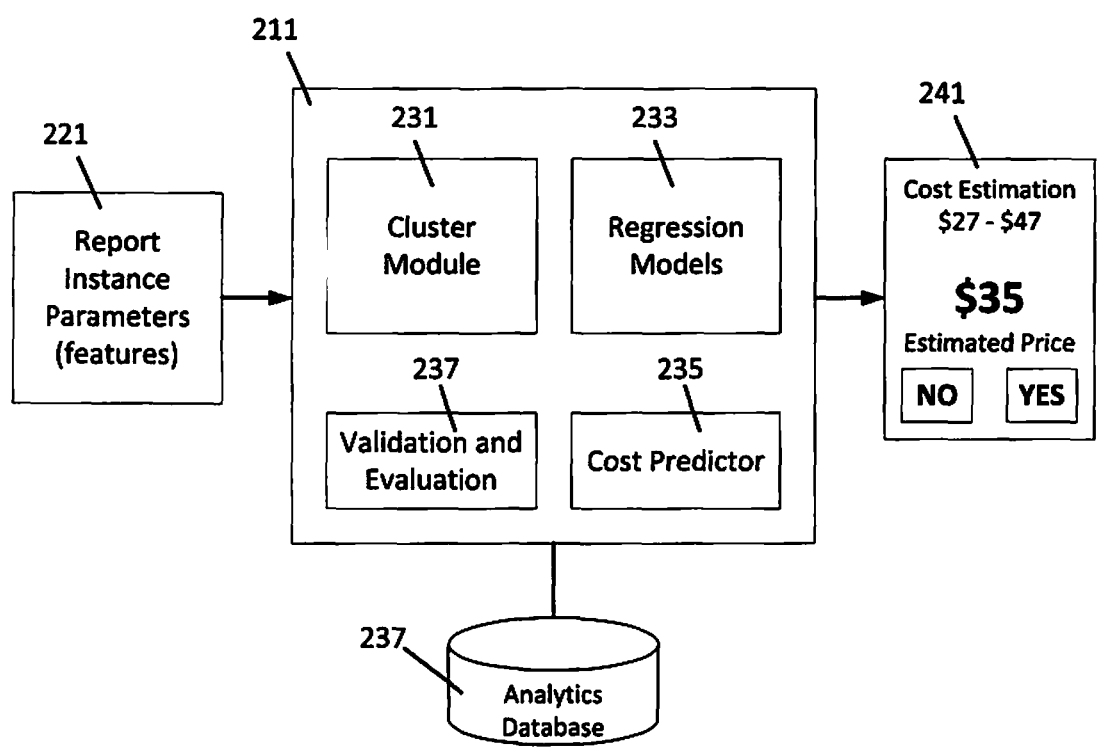
FIG. 2 is a block diagram of an embodiment of a report cost estimation system.

In an embodiment, a data analysis model is used to calculate estimated report prices using machine learning and a statistical approach. The inventive system can use different cost estimation resources in multiple process steps for a requested report. With reference to FIG. 2, the reporting software module 211 can be configured with a validation and evaluation module 237 to identify a designated regression model for various different groups of reports. In a first step, the reporting software module 211 can receive, extract and/or generate report instance parameters 221 for the requested report which can be known as "report features". The report features 221 represent the reports and the customer environment from the reporter job table of the DPA. In a second step, the requested report can be clustered by a cluster module 231 with similar reports that have been processed in the past, which can be stored in an analytics database 237. The new report clustering can be based upon the similarity of the report parameters which can include: data sources, operators, database size, classes, etc. In a third step, the reporting software module 211 can apply regression models 233 built on the cluster's data to predict the cost of the report by the cost predictor 235 in terms of resources utilization. The cost predictor 235 can then output a cost estimation 241 which can be transmitted to the client for approval. If the client approves the estimated price, the reporting software module 211 can run the report for the client.

Figure 3:
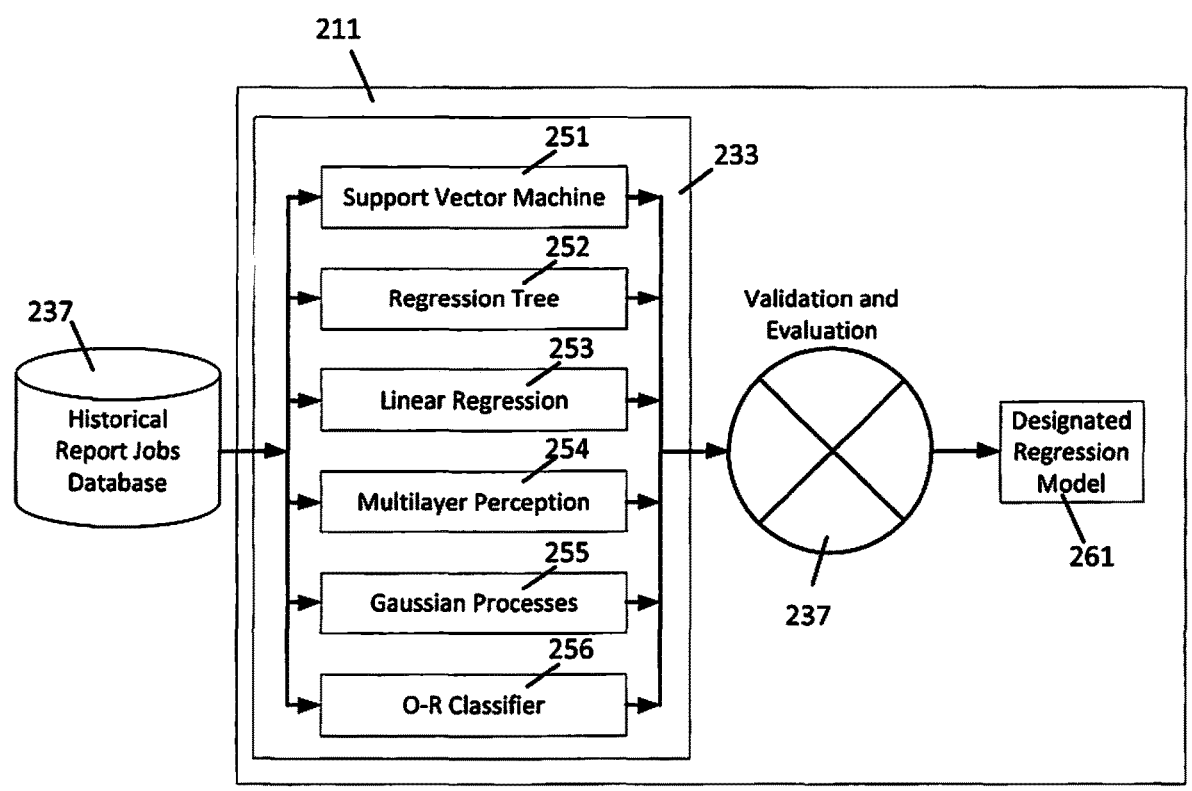
FIG. 3 is a block diagram of an embodiment of a report cost estimation system that uses historical data to determine the most accurate regression model for different type of reports.

With reference to FIG. 3, in an embodiment, the reporting software module 211 can access a historical report jobs database 237 and run report cost estimates using the report parameters of the prior reports include one or more of: data sources, operators, and database size. The estimated costs can be calculated using each of the available regression models 233 which can include: support vector machine 251, regression tree 252, linear regression 253, multilayer perception 254, Gaussian processes 255, zero-R classifier 256 and any other suitable type of regression model. The estimated report costs solved by each of the regression models can be compared to the actual report costs. The regression model producing the most accurate estimated report costs can be the designated regression model for the report and clustered report group. Details of these regression models are described in more detail below.

Support vector machines 251 are supervised learning models associated with learning algorithms which are more generally machine learning systems. The support vector machines can be used for the regression calculations to calculated estimated report costs. Given a set of training examples, each marked for belonging to one of two categories, a support vector machine 251 training algorithm builds a model that assigns new examples into one category or the other, making it a non-probabilistic binary linear classifier. A support vector machine 251 model is a representation of the examples as points in space, mapped so that the examples of the separate categories are divided by a clear gap that is as wide as possible. New examples are then mapped into that same space and predicted to belong to a category based on which side of the gap they fall on.

Regression trees 252 are predictive models which maps observations about reports to make conclusions about the reports estimated cost value. Regression trees 252 can use predictive modeling approaches used in statistics, data mining and machine learning. Regression tree 252 models where the target variable can take a finite set of values and the target variable can take continuous values. The regression tree 252 can build a decision/regression tree using information gain/variance. The regression tree 252 can be modified using reduced-error pruning with back fitting. The regression tree 252 may only sort values for numeric attributes once. Missing values can be dealt with by the regression tree 252 by splitting the corresponding instances into a plurality of pieces. The regression tree 252 can be fast decision tree learner and sorts values for numeric attributes once. Missing values are dealt with by splitting the corresponding instances into pieces.

Linear Regression 253 is the process of computing an expression that predicts a numeric quantity can be used as a predictive model to an observed data set of y and X values. Linear Regression 253 assumes that the expected value of the output given an input, E[y|x], is linear. After developing a linear regression model, the fitted model can be used to make a prediction of the values of x or y.

A multilayer perceptron regression model 254 can include a feed forward artificial neural network model that maps sets of input data onto a set of appropriate outputs. The multilayer perceptron regression model 254 can consist of multiple layers of nodes in a directed graph, with each layer fully connected to the next one. Except for the input nodes, each node is a neuron with a nonlinear activation function. A multilayer perceptron regression model 254 can utilize a supervised learning technique called back propagation for training the network. Multilayer perception 254 can be a classifier that uses back propagation to classify instances. In different embodiments, this neural network can be built by hand, or created by an algorithm, or both. The neural network can also be monitored and modified during training time. The nodes in this neural network can all be sigmoid except for when the class is numeric in which case the output nodes become unthresholded linear units.

A Gaussian process 255 is a regression model where observations occur in a continuous domain and every point is associated with a normally distributed random variable. Moreover, every finite collection of those random variables as a multivariate normal distribution. The distribution of a Gaussian process 255 is the joint distribution of random variables, and as such, it is a distribution over functions with a continuous domain. Viewed as a machine-learning algorithm, a Gaussian process 255 uses a measure of the similarity between points to predict the value for an unseen point from training data. The prediction is an estimate for that point and also has uncertainty information. The Gaussian process 255 is a statistical distribution $X_t$, $t \in T$, for which any finite linear combination of samples has a joint Gaussian distribution. A linear functional applied to the sample function $X_t$ will give a normally distributed result. Notationwise, one can write $X \sim GP(m,K)$, meaning the random function X is distributed as a GP with mean function m and covariance function K.

The zero R classifier 256 predicts the mean for a numeric class or the mode for a nominal class. The zero R classifier 256 can be considered as a baseline cost estimate value that can be used if the reporting software module's report cost estimate is worse than average value predictor. The zero R classifier 256 can rely on the target report cost value rather than predictors. The zero R classifier 256 predicts the mean for a numeric class or the mode for a nominal class. Although there is no predictability power in the zero R classifier 256, it can predict the majority of classes correctly and it is useful for determining a baseline performance as a benchmark for other classification methods. The zero R classifier 256 can be considered as a baseline cost estimate value that can be used if the reporting software module's report cost estimate is worse than average value predictor.

The cost estimates for each of the historical reports can be calculated by the cost predictor 235 using each of the available regression models 233 based upon the report parameters which can include one or more of: data sources, operators, and database size. Each of the historic reports has a known actual report cost. The predicted report costs for each of the regression models 233 can be compared to the known actual report costs by the validation and evaluation module 237. For each historical report, the regression model 233 that produced the estimated report cost that is closest to the known actual report cost can be the designated regression model 261 for that report and/or report cluster. In an embodiment, the validation and evaluation module 237 can also group the reports into different clusters which can have the same designated regression model and similar combinations of client database size, data sources, and operators report features.

Figure 4:
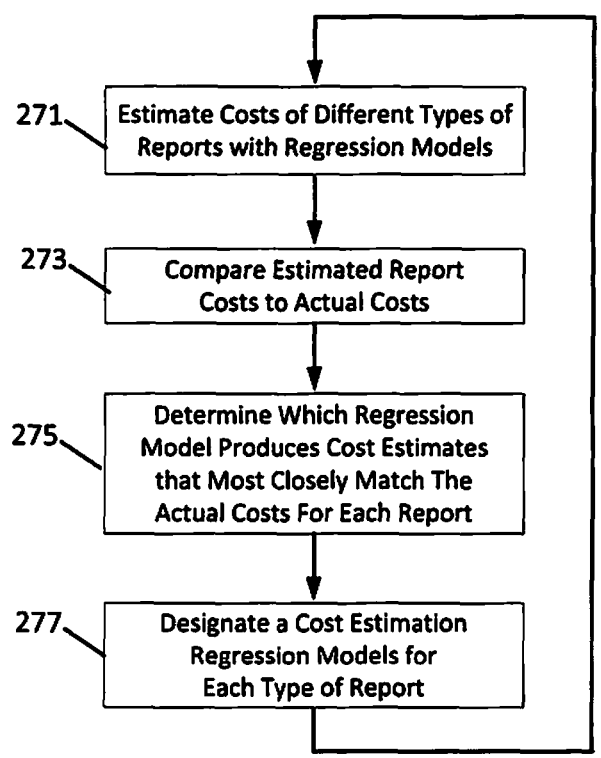
FIG. 4 is a flowchart of an embodiment of a process for using historical data to determine the most accurate regression model for different type of reports.

A process for identifying a designated regression model for different reports or clusters of reports is illustrated with reference to FIG. 4. The reporting software module can estimate the costs of different types of reports from the historical report cost database with a plurality of regression models 271. The estimated report costs for the different regression models can be compared to the actual report cost 273. The reporting software module can then determine which regression model produces the cost estimates that most closely match the actual costs for each report 275. The reporting software module identifies the regression model that produces the estimated report cost that most closely matches the actual report cost which can be the designated regression model 277. When actual reports are run, the cost data can be gathered and stored in the historical report jobs database. The described regression model analysis processing can be periodically repeated so that the designated regression model can be changed if a different regression model processes a better report cost estimate.

Figure 5:
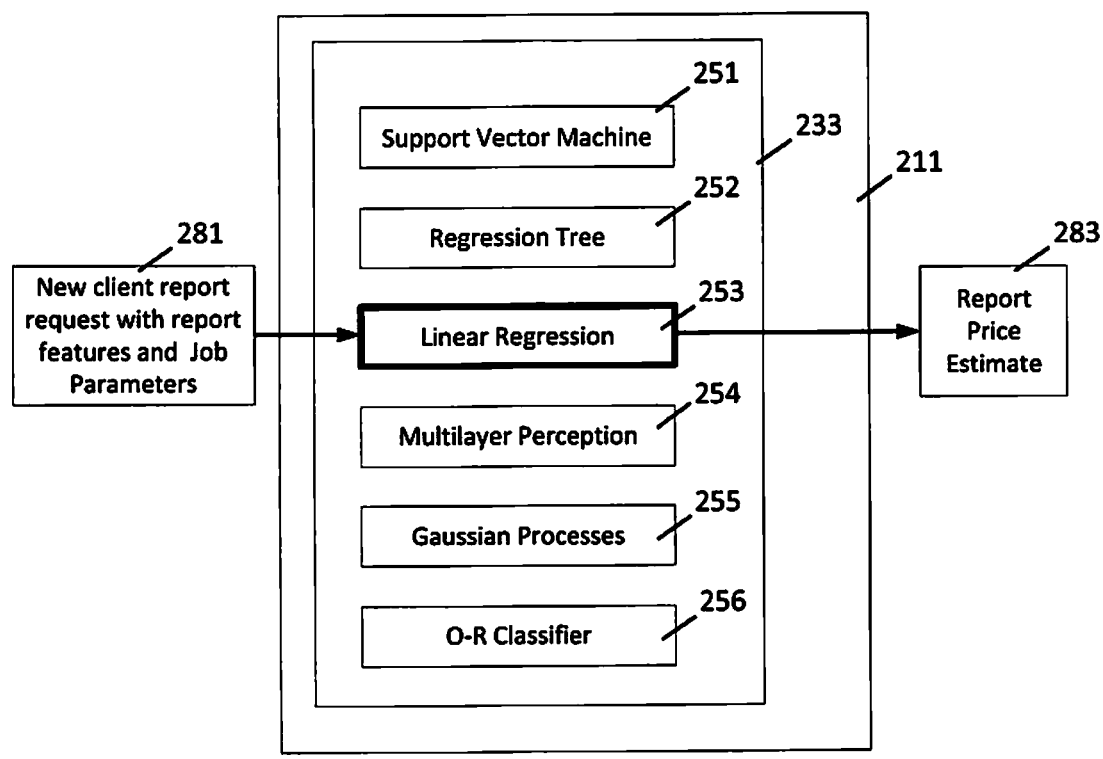
FIG. 5 is a block diagram of an embodiment of a report cost estimation system using a designated regression model for a determining a price estimate for a report.

With reference to FIG. 5, when a new report request 281 is requested, the reporting software module 211 can use the data sources, operators, and database size for the requested report to calculate an estimated report cost. The report parameters can be used to identify the corresponding report cluster and the reporting software module 211 can use the designated regression model for the report cluster that provides the most accurate report cost estimates. In this example, the reporting software module 211 may associate the new report request 281 with a report cluster with the linear regression 253 as the designated regression model. The reporting software module 211 can use the report features and report job parameters that include one or more of: data sources, operators, and database size for the new report request 281 and process this information with the linear regression model 253 to produce the report price estimate 283.

The actual reporting costs and the predicted report costs can be stored in the historical report jobs database and over an extended period of time a substantial amount of predicted and actual report data with the report features, job parameters, data sources, operators, and database size can be stored and used to improve the designated cost estimation regression models and the report cost estimate accuracy.

Figure 6A:
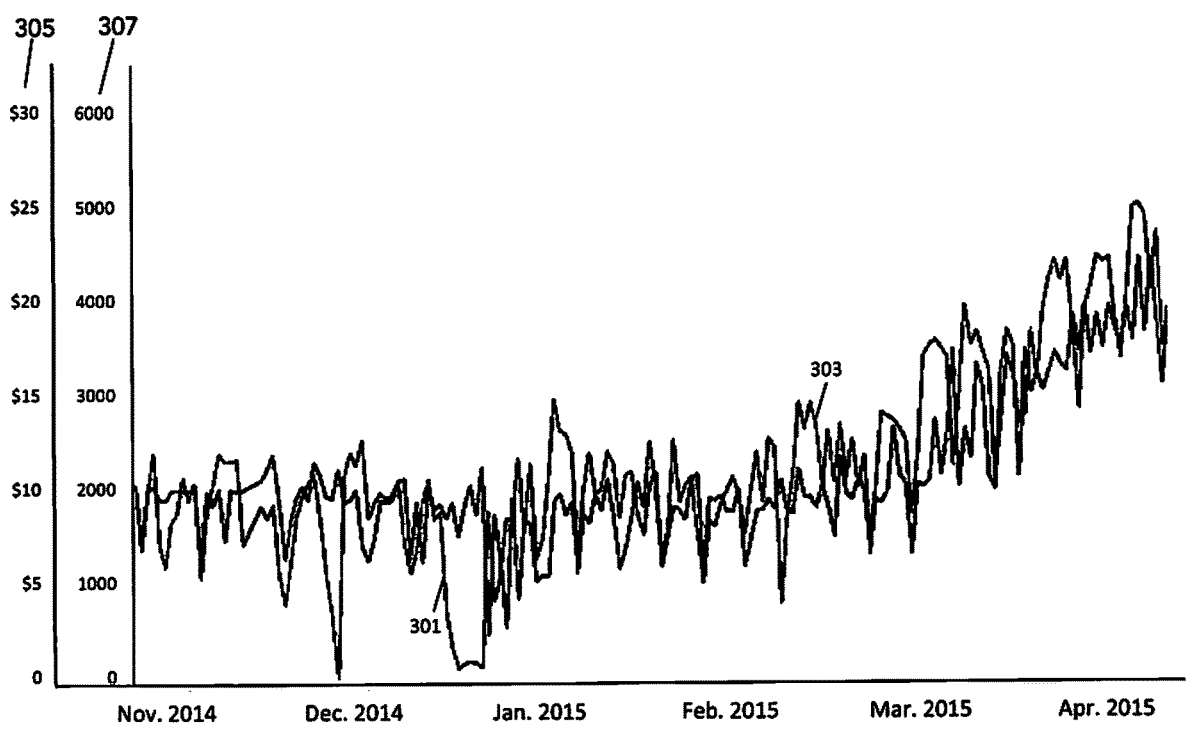
FIGS. 6A and 6B are graphs of predicted report costs and actual report costs over time using different regression models.
Figure 6B:
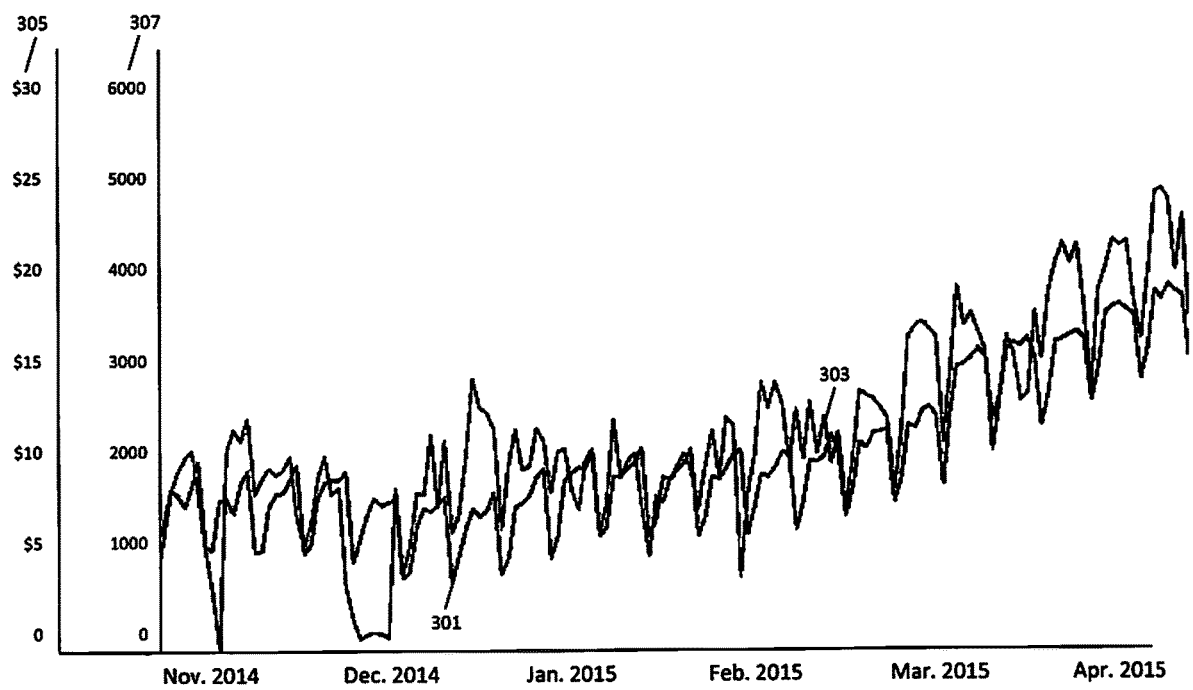

From this stored data, the accuracy of the actual reporting costs can be compared to the predicted report costs. FIGS. 6A and 6B illustrate graphs of the estimated report costs 301 and the actual report costs 303 for numerous client reports of the same type over an extended time 309 for two well-known regression algorithms. The results of the two cost estimate regression algorithms are applied to the same report data parameters, to compare the two prediction algorithms their results are presented side by side. In this example, FIG. 6A illustrates the report cost estimates and actual report costs for a support vector machine regression model and FIG. 6B illustrates the report cost estimates and actual report costs for a regression tree regression model. Based upon the comparisons of the predicted report costs to the actual report costs, the reporting software module can identify the most accurate regression model, which can be the designated regression model for each cluster group.

The vertical axis of the graph can represent the report cost 305 and/or processing time 307 for the report. The report cost 305 can be directly proportional to the processing time 307 of the report. The horizontal axis can represent time over several months 309. The estimated report costs 301 and the actual report costs 303 can overlap which indicates that the individual estimated report costs 301 can be lower or higher than the actual report costs 303. However, these variations may even out over time so that the average estimated cost 301 can be substantially equal to the average actual report cost 303 over time and the cumulative revenues received for the client reports can be substantially equal to the actual costs of these reports.

As reports are produced over time, clients can continue to store the predicted report cost 301 and actual report cost 303 data over time. The time required to produce the reports can be proportional to the amount of data be processed for the report. More specifically, the processing time to generate reports can be proportional to the quantity of data stored in the cloud based storage devices. Thus, as the client's business generates more data is produced and stored in the cloud, there is more data that must be analyzed for reports and the cost of the reports for these data storage systems can increase over time in proportion to the cumulative stored data as described.

Figure 7:
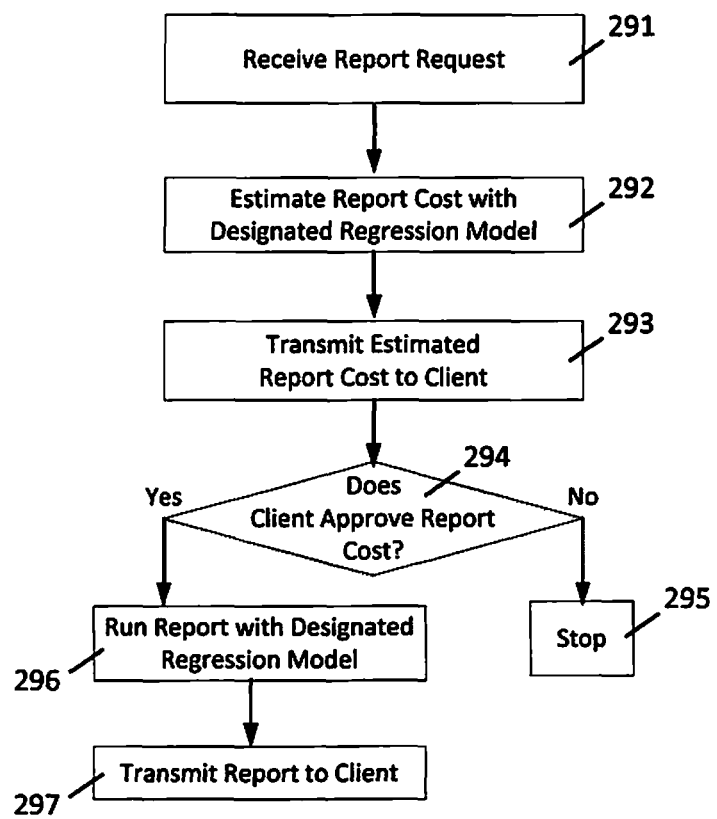
FIG. 7 is a flowchart of an embodiment for using a designated regression model to determine a cost estimate for a report and obtaining authorization before running the report.

With reference to FIG. 7, a flowchart for an embodiment of a method for processing client report requests is shown. The reporting software module can receive a report request 291 which can include report features and parameters. The reporting software module can respond to the request by identifying the corresponding report cluster based upon the report features and parameters and processing the report request data with the designated regression model to estimate the report cost 292. The estimated report cost is then transmitted from the reporting software module to the client computer 293. The client can either approve or reject the report cost 294. If the report cost is not approved, the system will stop the report process 295. If the report cost is approved, the reporting software module can run the requested report 296 and transmit the report to the client 297.

FIG. 8 shows a table that includes some possible general report names 321 in a first column as well as a list of report features 323 and report data sources 325 in the top row of the table. In the illustrated embodiment, the list of general report names 321 generally describe the contents of the report. In other embodiments, any other report names can be included in the report name list 321. If a new report is the same as one of the named reports on the report name list 321, the reporting software module can use the designated regression model for the corresponding report name with the new report. For each of the report names, there is a listing of report operator features 323 and report operators 325. The table shows the report operator features 323 and report operators 325 associated with each report name. For example, for the report name, System Change Summary, the report operator features 323 include "battery status" and "recovery connect managed" engines and the report operators 325 include "add field" and "DPA enabled count." The System Change Summary report can be a report in a cluster of reports that have a designated regression model that can be used to calculate the estimated cost of the report. If System Change Summary reports are requested again in the future, the reporting software module can use the designated regression model to process the data sources, operators and database size to estimate the costs of future reports.

In some situations, a new report may be requested for a new client and the new report may not clearly match any of the report names listed in the report name list 321. The reporting software module may attempt to most closely match the new report with a regression model of a known report. In an embodiment, the reporting software module may attempt to find a report name and designated regression model based upon the report "data sources" and report "operators". The operator features 323 can include: Join, Add Fields, Multiply Fields, Data Protection Advisor (DPA) Enable Count and Merge Elements. The cluster module can cluster the requested report with similar prior reports based upon various possible report features 323, which can include: classes, data sources and operators. A more complete listing of possible data sources is illustrated in FIGS. 9A-9F and a more complete listing of possible operators is illustrated in FIG. 10.

As discussed, prediction of a report cost can be done by using regression models applied to report features and job parameters which can include data from the report data sources 323 and report operators 325. Regression models can be fitted to a given training dataset. The regression models are then validated and evaluated on a given test dataset. The reporting software module can then select the regression model that best describes the report features and job parameters data and minimizes the error function outcome. The report features and job parameters data can be more generally described as report parameters. A plurality of regression models can be applied to the report features and job parameters data and the different regression models estimated cost outputs can be compared against each other. The best performing regression model can be the designated regression model and can be chosen for the report cost prediction processing.

In some embodiments, statistical methods can be used to extract and generate the report features and job parameters that influence and correlate with the cost of the report. Report features and job parameters like the scope of the report, database size, date sources, window slot, etc., can each have a great influence on the estimated costs of the reports. The designated regression models can use these report parameters to calculate the estimated value of new reports.

In different embodiments, report representation mechanisms can be used which have a high degree of flexibility that derive varies complexity levels that make the representation of a report to be hard task. For example, when report cost estimates are needed for a new client there can be "Cold Start" challenges. The report cost estimations for new client reports can be problematic because a new client has no historical records in the database that can be used to estimate the costs of the reports. For new clients, the reporting software module can identify the cluster group that has report features and job parameters that most closely match the new client data and requested reports. The reporting software module can then use the designated regression model for the closest matching report cluster group to estimate the report costs. As discussed, the historical data for the reports cost estimates and the actual report costs for the new client can be stored and analyzed by the reporting software module. Adjustments can be made to the report cluster and designated regression model to optimize the future report cost estimates as described above.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for determining estimating costs for reports for data stored on cloud based storage comprising:

providing a data analysis model having a processor, a clustering module with a plurality of cluster report groups, a database storing historic reports, estimated costs and actual costs for the historic reports, and a plurality of regression models wherein each of the plurality of cluster report groups has a designated regression model from the plurality of regression models;

receiving a first set of report parameters by the data analysis model for a first report by the data analysis model from a first client computer;

determining a first cluster report group that matches the first report parameters for the first report from the plurality of cluster report groups;

determining a first designated regression model that produces most accurate estimated report costs compared to actual report costs for the first cluster report group;

calculating a first estimated cost of the first report by the processor applying the first designated regression model to the first set of report parameters before the first report is run;

transmitting the first estimated cost of the first report to the first client computer;

receiving by the processor, an approval of the first estimated cost from the first client computer; and preparing by the processor, the first report after receiving the approval of the first estimated cost.

2. The method of claim 1 further comprising:

receiving a second set of report parameters by the data analysis model for a second report by the data analysis model from a second client computer;

determining a second cluster report group that matches the second report parameters for the second report from the plurality of cluster report groups;

determining a second designated regression model that produces most accurate estimated report costs compared to actual report costs for the second cluster report group wherein the second designated regression model is different than the first designated regression model;

calculating a second estimated cost of the second report by the processor applying the second designated regression model to the second set of report parameters before the second report is run;

transmitting the second estimated cost of the first report to the first client computer;

receiving a rejection of the second estimated cost; and canceling the second report after receiving the rejection of the second estimated cost.

3. The method of claim 1 wherein the plurality of regression models includes: a support vector machine, a regression tree, a linear regression, a multilayer perceptron, Gaussian processes and/or a zero-R classifier.

4. The method of claim 1 wherein the first set of report parameters includes: data sources, operators, and database size.

5. The method of claim 1 wherein the first set of report parameters includes data sources and operators.

6. The method of claim 1 further comprising:
receiving a second set of report parameters by the data analysis model for a second report by the data analysis model from a second client computer;
determining a second cluster report group having a second designated regression model from the plurality of cluster groups that matches the second report parameters for the second report, wherein the second designated regression model is different than the first designated regression model;
determining a second designated regression model that produces most accurate estimated report costs compared to actual report costs for the second cluster report group;
calculating a second estimated cost of the second report by the processor applying the second designated regression model to the second set of report parameters before the second report is run;
receiving by the processor, an approval of the second estimated cost from the second client computer; and
transmitting the second estimated cost of the second report to the second client computer.

7. The method of claim 6 further comprising:
receiving approval of the second estimated cost from the second client computer before preparing the second report.

8. The method of claim 6 further comprising:
storing the second estimated cost and an actual cost for preparing the second report in a database.

9. The method of claim 1 further comprising:
providing report parameters for a plurality of prior reports by the data analysis model to the processor;
grouping the plurality of prior reports into a plurality of cluster groups wherein the prior reports in each of the cluster groups have similar report parameters;
calculating the estimated costs of each of the plurality of prior reports by processing the report parameters with plurality of regression models;
determining the regression models that produce the estimated costs of the prior reports that most closely matches the actual costs of the reports for each of the plurality of prior reports; and
identifying designated regression models for each of the cluster groups of the prior reports.

10. The method of claim 9 wherein the plurality of regression models include: a support vector machine, a regression tree, a linear regression, a multilayer perceptron, Gaussian processes and a zero-R classifier.

11. The method of claim 1 wherein the report parameters include one or more of: data sources, operators, and database size.

12. A cloud storage platform with a data analysis model comprising: a processor, a clustering module with a plurality of cluster report groups, a database storing historic reports, estimated costs and actual costs for the historic reports, and a plurality of regression models wherein each of the plurality of cluster report groups has a designated regression model from the plurality of regression models; wherein the processor receives a first set of report parameters by the data analysis model for a first report from a first client computer; the processor determines a first selected cluster report group that matches the first report parameters for the first report; the processor determines a first designated regression model that produces most accurate estimated report costs compared to actual report costs for the first cluster report group; the processor calculates a first estimated cost for the first report by applying the first designated regression model to the first set of report parameters before the first report is run; and the processor transmits the first estimated cost of the first report to the first client computer and receives approval of the first estimated cost from the first client computer before preparing the first report.

13. A computer program product comprising a non-transitory computer usable medium having machine readable code embodied therein for:
providing a data analysis model having a clustering module with a plurality of cluster report groups, a database storing historic reports, estimated costs and actual costs for the historic reports, and a plurality of regression models wherein each of the plurality of cluster report groups has a designated regression model from the plurality of regression models;
receiving a first set of report parameters by the data analysis model for a first report by the data analysis model from a first client computer;
determining a first cluster report group that matches the first report parameters for the first report from the plurality of cluster report groups;
determining a first designated regression model that produces most accurate estimated report costs compared to actual report costs for the first cluster report group;
calculating a first estimated cost of the first report by the processor applying the first designated regression model to the first set of report parameters before the first report is run;
transmitting the first estimated cost of the first report to the first client computer;
receiving approval of the first estimated cost from the first client computer; and
preparing the first report after receiving the approval of the first estimated cost.

14. The computer program product of claim 13 further comprising:
receiving a second set of report parameters by the data analysis model for a second report by the data analysis model from a second client computer;
determining a second cluster report group that matches the second report parameters for the second report from the plurality of cluster report groups;
determining a second designated regression model that produces most accurate estimated report costs compared to actual report costs for the second cluster report group wherein the second designated regression model is different than the first designated regression model;
calculating a second estimated cost of the second report by the processor applying the second designated regression model to the second set of report parameters before the second report is run;
transmitting the second estimated cost of the first report to the first client computer;
receiving a rejection of the second estimated cost; and
canceling the second report after receiving the rejection of the second estimated cost.

* * * * *